United States Patent [19]
Morosini

[11] Patent Number: 4,904,335
[45] Date of Patent: Feb. 27, 1990

[54] DEVICE FOR PICK-UP AND ASSEMBLY OF ELEMENTS OF IDENTIFICATION OF CABLES AND ELECTRICAL APPLIANCES

[76] Inventor: Flavio Morosini, 27, rue du Rouvion, F-54800 Hatrize, France

[21] Appl. No.: 218,288

[22] PCT Filed: Aug. 12, 1987

[86] PCT No.: PCT/FR87/00318

§ 371 Date: Jun. 13, 1988

§ 102(e) Date: Jun. 13, 1988

[87] PCT Pub. No.: WO88/01432

PCT Pub. Date: Feb. 25, 1988

[30] Foreign Application Priority Data

Aug. 14, 1986 [FR] France ................................ 86-11768
Jul. 31, 1987 [IT] Italy ................................ 43519 A/87

[51] Int. Cl.⁴ ................................ B32B 31/16
[52] U.S. Cl. ................................ 156/584; 156/344; 269/47; 269/50; 269/900; 269/909

[58] Field of Search .................. 156/344, 584; 269/47, 269/50, 900, 909; 312/183

[56] References Cited

FOREIGN PATENT DOCUMENTS 2137586 10/1984 United Kingdom .
2141691 1/1985 United Kingdom .

*Primary Examiner*—Robert A. Dawson
*Attorney, Agent, or Firm*—Horst M. Kasper

[57] ABSTRACT

The device comprises a comb comprised of two dismountable halves of which the successive teeth belong alternatingly to one half and to the other half and are separated, on the assembled comb, by a pitch equal to the pitch which separates two branches of a prehension means for taking identification elements which may be threaded in the supports carried by both teeth of the assembled comb so that two coded messages are simultaneously composed and are separated by dismounting the comb, for the two ends of an electric wire.

24 Claims, 2 Drawing Sheets

FIG. 1
PRIOR ART
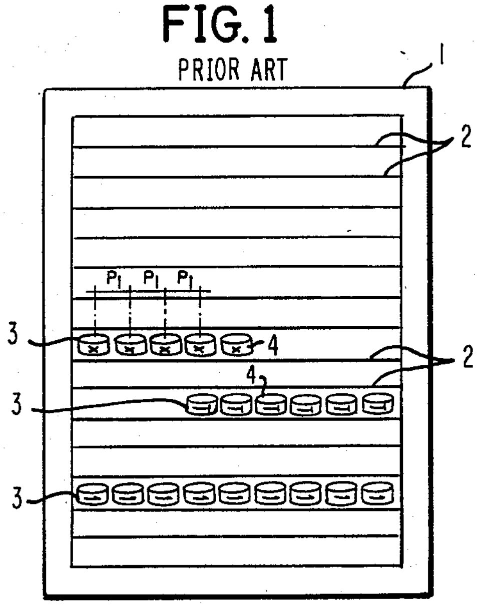
FIG. 2
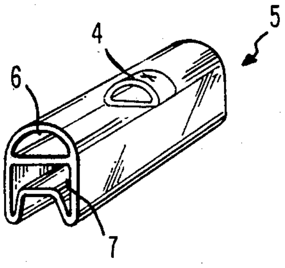
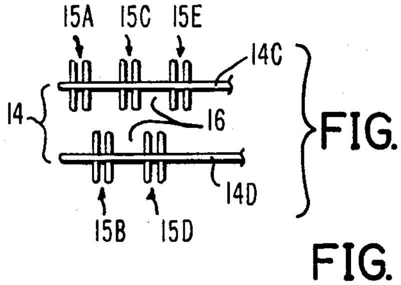
FIG. 10
FIG. 3
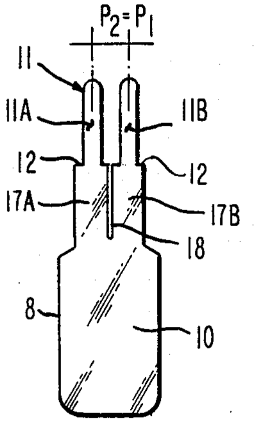
FIG. 4
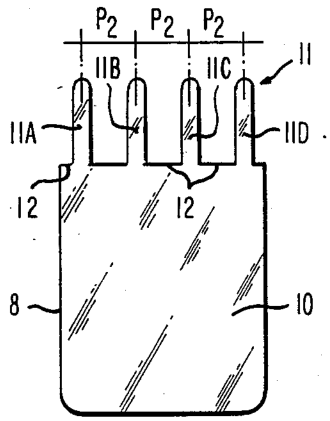
FIG. 5
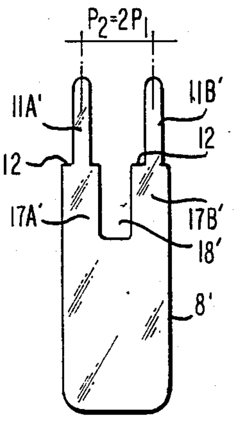
FIG. 6
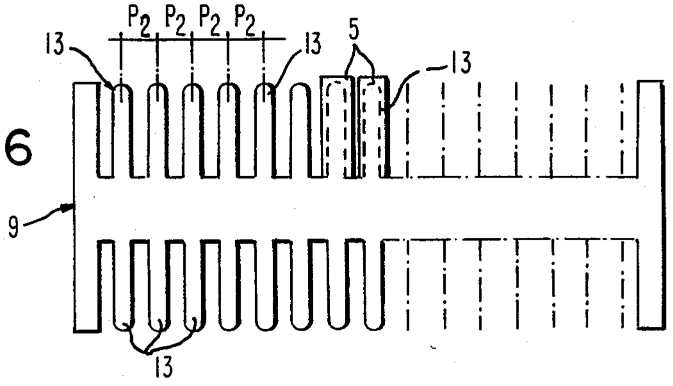

Fig. 7
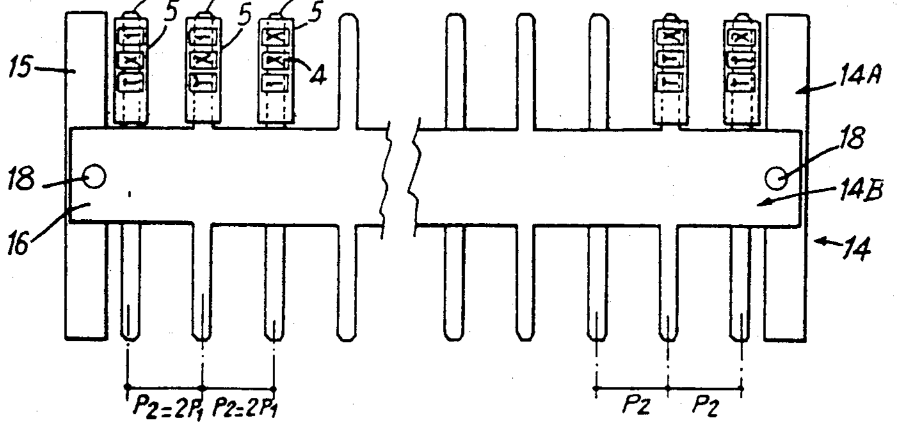
Fig. 8
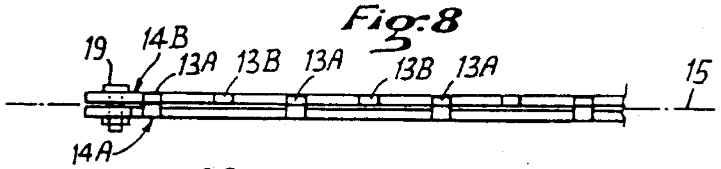
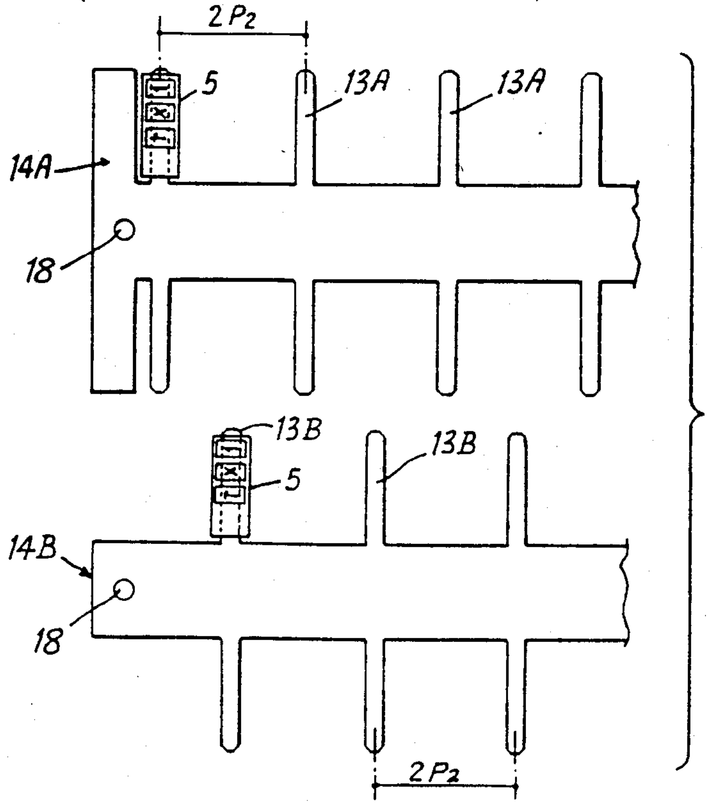
Fig. 9

DEVICE FOR PICK-UP AND ASSEMBLY OF ELEMENTS OF IDENTIFICATION OF CABLES AND ELECTRICAL APPLIANCES

The invention has as its object a device which greatly facilitates the pick-up and assembly, in accordance with a well-defined code, of elements of identification which are currently in use for locating the wire strands at two distant ends of an electric cable, or the terminals of electrical appliances.

There are in existence elements of identification of various types; the invention is in no way limited to a specific type of elements of identification; it is possible to readily adapt it to different types of elements. To be more explicit, we shall in the following refer to elements of identification which, either totally or in part, consist of a link or a sleeve or at least of a ring-shaped configuration, into which can be introduced a rod which enables the pick-up of one specific element from the entire assembly of elements. An example of elements of identification of this type with which the device of the invention can be used, is found in the document FR-A-2.239.182. In this document, tubular elements of identification are described which bear a symbol, either a number or a letter, and which are arranged in order in the switch cabinet in rows of several elements, whereby each row bears identical symbols; a short measuring tape is designed to be successively threaded into several ring-shaped elements which are picked up, one by one, in the desired order to compose a message code of identification, e.g. a number; the elements which compose this message are then transferred, as a whole, on a carrier for the message code of identification already fixed or destined to be fixed on a wire strand of a cable or on an electric terminal. Hence, each message of identification is composed individually, element by element.

The main object of the invention is to provide a device which permits at least a doubling of the speed with which tubular elements of identification are picked up and message codes of identification for wire strands or electric terminals are composed.

It is a further objective of the invention to compose simultaneously pairs of message codes of identification which are identical, and to enable an easy separation of messages of identification of each identical pair for locating the two distant ends of the wire strands without the risk of error in the messages intended for these two ends.

Known means of identification include the following:

a carrier with distinct rows for the elements of identification, the elements of identification, at least partially tubular, are arranged in order on these rows and are spaced by a defined step P1 and bear in each row an identical symbol, the carriers are designed to each receive a series of elements of identification, thus composing a message code of identification, a means for picking-up these elements of identification which has a section which can be threaded into a tubular part of the elements of identification, the device of the invention consisting on the one hand of a comb with parallel teeth which are spaced by a step P2 the value of which is equal to or several times the value of the step P1 of the elements of identification, whereby each of these teeth is designed to have mounted, in a removable manner, a carrier of a series of elements which compose a message code of identification, on the other hand, of a means of pick-up with at least two parallel arms which are spaced at a step P2 which is identical to the step P2 of the teeth of the comb, whereby each of these arms has a very straight part which can be threaded into the tubular section of the elements of identification, whereby this straight part is limited, opposite to its free end, by a top catch.

According to an improvement and further development of the invention, the comb consists of two halves which can be easily assembled or separate and of a joint face, the thickness of which permits it to be fitted between the two halves, whereby the successively arranged teeth of the comb belong, alternatively, either to the one or the other half. Preferably, the teeth of at least one of these halves are off-set so that all teeth are on the same face once the two halves are assembled.

To assist in thoroughly understanding the invention, an example of a preferred form of execution is described:

FIG. 1 presents a top view of a conventional carrier with distinct rows carrying the elements of identification, whereby the latter are also of a known type;

FIG. 2 presents a perspective view of a known carrier for elements of identification composing a message code of identification;

FIGS. 3, 4 and 5 are, respectively, topviews of three example of means of pick-up in accordance with the invention;

FIG. 6 presents a topview of a comb in accordance with the invention which can be used with the means of pick-up in FIG. 3;

FIG. 7 presents a topview of a comb in accordance with the invention which can be used with the means of pick-up in FIG. 5 and which can be separated into two halves;

FIG. 8 presents a front view of the comb of FIG. 7;

FIG. 9 presents a view depicting the comb of FIG. 7, separated into two halves;

FIG. 10 depicts a variation of the comb according to the invention.

FIG. 1 shows a switch cover 1 the inside of which is divided by inclined parallel partitions 2 on which are arranged successive rows 3 of tubular elements of identification 4. These elements are simply the end pieces of plastic tubes with an out of round cross section; on the outer face of each of the elements 4 is imprinted an identification symbol, for example an X or T or 1, or other signs. On an identical row 3, all elements of identification 4 bear the same symbol; on each row the elements 4 are spaced at a defined step P1. The elements 4 are fastened on the inclined partitions 2 by means of an adhesive material which permits their removal with a minimum of force. Such an assembly is well known and available commercially.

FIG. 2 shows a known carrier 5 which is designed to receive several elements of identification 4 which are arranged in order for composing an identification message. This carrier 5 consists of an assembly of end pieces of double tubes of a transparent and flexible plastic material, and has a first tubular section 6 and a second tubular section 7. The latter serves to join the carrier 5 with a wire strand or a cable which is to be identified, i.e. the strand or the cable can be threaded through this second tubular section 7. The first tubular section 6 has an inner cross section which is analogous to the outer cross section of the elements of identification 4 which permits the threading of the latter with a minimum of force and holding the threaded elements 4 (as depicted in FIG. 2) in place by the natural elasticity of the material.

FIGS. 3 and 4 show a means of pick-up 8 according to the invention which can be used with the comb 9 of the invention, depicted in FIG. 6. The pick-up 8 has a flat body 10 so that it can be held easily in the hand; one of its ends is equipped with several parallel arms 11; the pick-up 8 of FIG. 3 is equipped with two arms 11A and 11B; the one of FIG. 4 with four arms, 11A to 11D. This number is only limited by the preferred way of using the pick-up. The parallel arms 11A to 11B are spaced by a step P2, the value of which is equal to the value of step P1 of the elements of identification 4 in the switch cover 1. Each arm 11 is limited opposite to its free end but preferably on two opposing ends, by a collar 12. These collars 12 determine the length of the arms 11, their length being equal to the length of the carrier 5. These collars 12 serve to arrest the elements of identification 4 which are threaded on the arms 11.

The comb 9 is equipped with teeth 13 on two opposite sides; these teeth 13 are parallel and spaced by a step P2 which is equal to that of the arms 11; the cross section and the length of the teeth 13 are chosen for their capability to thread or attach a carrier 5 of FIG. 2 by introducing a tooth 13 into the second tubular section 7 of the carrier. Each carrier 5 threaded onto a tooth 13 is retained in place by friction and can easily be removed with a minimum of force. FIG. 5 only shows two carriers 5 threaded onto two teeth 13. In this state, the first tubular section 6 of all carriers 5 is on the same side of comb 9. It is thus easy to simultaneously pick up several elements of identification 4 in the switch cover 1 by means of the pick-up 8, by introducing the arms 11 of the latter into several elements of identification 4 which are successively arranged at spaces of a step P1 which is equal to the step P2 of the arms 11. Then, having picked up several elements 4, they can be introduced simultaneously into the first tubular section 6 which has an equal number of carriers 5 which are supported on the teeth 13 of the comb 9. During this operation, each element 4 can slide along the arm 11 with which it has been picked up but is finally arrested by the collar 12 against which it comes to rest. It can then be forced to a desired depth inside the first tubular section 6. FIG. 7 shows elements 4 successively threaded in the carriers 5 at different depths in order to compose a message code of identification, for example TX1 or TTX, simultaneously in several carriers 5.

In this way it is possible to prepare on one or several combs 9, a large number of carriers 5 which each carry the same message code of identification as a function of the number of arms 11 of the pickup 8. This number is only limited by the way in which one wishes to use the pick-up.

FIG. 5 shows a means of pick-up 8 which is identical to that of FIG. 3 and consists of two arms 11A and 11B, with the difference however that the arms 11A′ and 11B′ are spaced at an interval P2 which is double the step P1.

Under certain circumstances, the carriers 5 may be of a size which makes it difficult or even impossible to thread them on successive teeth 13 of the comb 9, separated by a step P2=P1. In such a case, step P2 of the teeth 13 is given a value which is an integral multiple of P1; naturally, this value is also given to the interval which separates the axes of the arms 11. In the switch cover 1, the elements of identification 4 remain at the distance of the value P1. During pickup the elements 4 are thus not next to, but separate from step P2. FIG. 7 shows a comb 14 with teeth 13 separated by a step P2=2P1 which can be used with the means of pick-up 8′ of FIG. 5.

According to a further development and improvement of the invention, the comb 14 of FIG. 7 has an additional feature. It consists of two halves 14A and 14B which are assembled but can be separated by a joint face 15 of suitable thickness, as shown in FIGS. 8 and 9, the joint face 15 being depicted in FIG. 8 by a dot-and-dash-line. The word 'half' does not mean that the comb 14 is strictly separated into two identical parts; it means that one half of the teeth, minus one unit, belong to a first small plate 15 and that the second half of this number of teeth, plus one unit, belong to a second small plate 16 so that on assembling and attaching to one another the two small plates, successive teeth belong, alternatively, to the first small plate 15 and to the second small plate 16.

We distinguish, therefore, between the teeth 13A of the comb 14A and the teeth 13B of the comb 14B. The two small plates 15, 16, provided with teeth, are assembled by all possible means which permit their joining and separating in an easy and rapid manner. Assembled appropriately, they are ready for use. FIGS. 7 and 8 show that for such an assembly holes 18 and screws 19 are provided.

It is preferable to have all teeth 13A and 13B on the same face once the two halves 14A and 14B have been assembled. FIG. 8 shows that the teeth 13A of the small plate 14A have at their base a double camber thus putting them back onto the face of the teeth 13B. Alternatively, the teeth 13A and 13B of the two small plates could be offset, in a less pronounced manner, in order to be on a common face after assembly, with a step P2 between the successive teeth. It is noted that the value of this step is not relative to the fact that the comb has been executed in two halves which may be assembled and separated. The value of the step P2 depends on the size of the carriers 5. On each half 14A and 14B, teeth 13A and 13B are of necessity spaced at a step 2P2.

The detachable comb 14 of FIGS. 7 to 9 and the pick-up 8 of FIG. 5 are used in the following way:

The comb 14 is assembled and its teeth 13A and 13B are arranged on a carrier 5. The elements of identification 4 are picked up, two by two, in the switch cover 1 by means of the pick-up 8′, consisting of two arms 11A′ and 11B′. The two elements are then introduced simultaneously into the first tubular section 6 of the two elements of identification 4 which are situated on two teeth next to the assembled comb 14. This procedure is repeated as often as is necessary to compose, at the same time, on two carriers 5 the desired coded message, for example TX1 on the two teeth at the extreme left of FIG. 1.

Once a coded message of identification is composed in pairs on all the teeth of the comb 14, the two halves 14A and 14B of the comb are separated in order to obtain the two halves visible from FIG. 9 which carry, in the same order, identical coded messages due to the fact that these messages have been composed simultaneously. Half 14A locates the wire strands of one end of the electric cable, whereas the other half locates the strand of the other end. The risk of error in the composition of the coded messages is eliminated which must be identical for both ends of the strands.

It is also noted that the device of the invention permits the preparation, in advance, of coded messages of identification on combs 9 and 14, preferably on detachable combs 14A and 14B, whereas previously they had to be composed at the point of connection of the strands, first for one and then for the other end.

FIG. 10 presents a diagrammatic view, on a smaller scale, of part of the two halves 14C and 14D of a comb 14 on which the teeth are arranged in pairs 15A to 15D at an interval 16 from two nearby teeth capable of receiving a pair of teeth from the other half so that on the assembled comb successive teeth which are spaced at a step P2 belong in pairs an alternatively to half 14C and to half 14D.

The comb of FIG. 10 is used with the pick-up 8 with four arms 11A to 11D spaced at a step P2 as per FIG. 4.

In this manner, four identical messages of identification can be composed simultaneously on the assembled comb of FIG. 10. After the separation of the two halves of the comb, the four messages are themselves separated into two identical pairs, for example on pair 15A and on pair 15B. At each of the two distant ends of an electric cable, the wire strands and the electric terminals corresponding to these strands are easily located without the risk of error in the composition of the four messages. The terminals of the two switch cabinets which are at equal distances may also be located.

In accordance with the invention the execution of the comb 9 in more than two toothed parts is possible, for example in three parts or more which are separated by the appropriate thickness of parallel joint faces, whereby the teeth of the assembled comb belong, respectively, to different toothed parts. Preferably, the teeth 13 which are spaced at a step P2 on the assembled comb 9, respectively belong to the toothed parts. Such a comb is used with a pick-up 8, the number of arms 11 of which is equal to the number of toothed parts of the comb.

The means of pick-up 8 may be improved in the following manner: in the example illustrated in FIG. 3 where there are two arms 11A and 11B at a step P2=P1, each extreme part 11A and 11B is followed, beyond the arresting collar 12, by a long center part 17A, 17B respectively, the width of which is definitely equal to the inner width of the first tubular section 6 of the carrier 5 and the length of which is definitely equal to the length of this first tubular section 6. The two arms 11A and 11B are separated by a slot 18 the length of which is identical to the width of the center parts 17A and 17B.

Following the pick-up, once two elements of identification 4 are mounted by the arms 11A, 11B and on introducing them simultaneously into the two nearest carriers 5, these elements are pushed by means of the arresting collar 12 to the desired depth and by also engaging the long center parts 17A and 17B in these carriers 5. The slot 18 permits the separation of one or the other of the near edges of the two center parts and thus facilitates their respective entry to the inside of the carriers 5. In the example illustrated in FIG. 5 where the arms 11A' and 11B' are spaced at a step P2=P1, the long center parts 17A' and 17B' are separated by a recess or groove 18' the width of which is not appropriate to the width of the slot 18.

I claim:

1. Device for the realization of coded messages of identification of wire strands and electric terminals consisting of a carrier (1) with distinct rows (2) for the elements of identification, elements of identification (4), at least partly tubular, arranged on the distinct rows (2) in spaces of a well-defined step P1 which on each row (2) carry the same symbol, carriers (5) which are able to receive each a series of elements of identification (4), composing a coded message of identification, and capable of being fixed to the wire strands and the electrical terminals, characterized in that it consists of: a comb (9, 14) with teeth (13) arranged in parallel at two opposite sides of the comb and said teeth spaced at a step P2 the value of which is equal to, or several times, the value of step P1 of the elements of identification (4) in rows (2), whereby these teeth (13) conform to receive and carry, in a removable manner, a carrier (5) for the elements of identification (4).

2. Device according to claim 1 further comprising a pick-up (8, 8') with at least two parallel arms (11), spaced at a step P2 which is identical to the step P2 of the teeth (13) of the comb (9, 14), whereby each of these arms (11) possesses an extreme part capable of being threaded into the tubular section of the elements of identification (4) and limited at the end opposite to the free end by an arresting collar (12).

3. Device according to claim 2, characterized in that it has a pick-up 8 with two parallel arms (11A, 11B) which are spaced at a step P2 equal to the step P1 of the elements of identification (4) which are arranged oń the carrier (I), the teeth (13) of the comb (9, 14) being spaced at the same step P2.

4. Device according to claim 2, characterized in that it has a pick-up (8) with four parallel arms (11A, to 11D) which are spaced at step P2 equal to the step P1 of the elements of identification (4) which are arranged of the carrier (1), the teeth (13) of the comb (9, 14) being spaced at the same step P2.

5. Device according to claim 2, characterized in that it has a pick-up (8') with two parallel arms (11A', 11B') which are spaced at a step P2 equal to, or double the step P1 of the elements of identification, the teeth (13) of the comb (14) being spaced at the same step P2.

6. Device according to claim 1, characterized in that the comb (14) consists of several toothed sections (14A, 14B) which are placed, assembled and separated by appropriate means (18, 19) on parallel flat faces (15) of appropriate thickness, on the comb, the teeth (13A, 13B) of the assembled comb belonging, respectively, to the toothed sections (14A, 14B).

7. Device according to claim 5, characterized in that the successive teeth (13A, 13B) of the comb belong, respectively and alternately to toothed sections, whereby the pick-up (8, 8') has arms (11A', 11B') the number of which is equal to the number of toothed sections (14A, 14B) of which the comb consists.

8. Device according to claim 6, characterized in that the comb (44) consists of two halves (14A, 14B) which can be assembled and separated by appropriate means (18, 19) on one or the other of joint faces (15) of appropriate thickness, the successive teeth (13A, 13B) of the assembled comb (14) belonging, alternately, to one or the other half and being separated on each half by a step P2.

9. Device according to claim 6, characterized in that the comb (14) consists of two halves (14A, 14B) which can be assembled and separated by appropriate means (18, 19) on one or the other of joint faces (15) of appropriate thickness, the successive teeth (13A, 13B) of the assembled comb (14) belonging, alternately, to one or the other half and being divided on one half into pairs (15A to 15D) of two teeth, separated between the pairs by an interval (16) capable to receive a pair of two teeth belonging to the other half, the successive teeth being separated on the assembled comb by a step P2.

10. Device according to claim 8, characterized in that the teeth (13A) of at least one of the halves (14A) of the comb (14) are transported in a manner so that all teeth are arranged on the same face once the two halves are assembled.

11. Device according to claim 2, characterized in that each arm (11) of the pick-up (8) has beyond the section (4) which is limited by an arresting collar (12) a long center part (17A, 17B, 17A', 17B') the width of which corresponds to an inner width of a first tubular section (6) of the carrier (5), whereby these long center parts (17A, 17B, 17A', 17B') are limited opposite each arm by a slot (18, 18') the length of which slot is equal to the length of the first tubular section (6) of the carrier (5).

12. Device according to claim 9, characterized in that the teeth (13A) of at least one of the halves (14A) of the comb (14) are transported in a manner so that all teeth are arranged on the same face once the two halves are assembled.

13. Device for the realisation of coded messages of identification of wire strands and electric terminals, consisting of

- a carrier (1) with distinct rows (2) for the elements of identification,
- elements of identification (4), at least partly tubular, arranged on the distinct rows (2) in spaces of a well-defined step P1 which on each row (2) carry the same symbol,
- carriers (5) which are able to receive each a series of elements of identification (4), composed a coded message of identification, and capable of being fixed to the wire strands and the electrical terminals in order to identify
- a means of pick-up (8, 8') of the elements of identification (4) on rows (2) of the carrier (1), with a section capable of being threaded into the tubular elements of identification (4), characterized in that it consists of:

a pick-up (8, 8') with at least two parallel arms (11), spaced at a step P2 which is identical to the step P2 of the teeth (13) of a comb (9, 14), whereby each of theses arms (11) possesses an extreme part capable of being threaded into the tubular section of the elements of identification (4) and limited at the end opposite to the free end by an arresting collar (12).

14. Device according to claim 13, characterized in that it has a pick-up 8 with two parallel arms (11A, 11B) which are spaced at a step P2 equal to the step P1 of the elements of identification (4) which are arranged on the carrier (1), the teeth (13) of the comb (9, 14) being spaced at the same step P2.

15. Device according to claim 1, characterized in that it has a pick-up (8) with four parallel arms (11A to 11D) which are spaced at step P2 equal to the step P1 of the elements of identification (4) which are arranged of the carrier (1), the teeth (13) of the comb (9, 14) being spaced at the same step P2.

16. Device according to claim 13, characterized in that it has a pick-up (8') with two parallel arms (11A', 11B') which are spaced at a step P2 equal to, or double the step P1 of the elements of identification, the teeth (13) of the comb (14) being spaced at the same step P2.

17. Device according to claim 13, characterized in that each arm (11) of the pick-up (8) has beyond the section (4) which is limited by an arresting collar (12) a long center part (17A, 17B, 17A', 17B') the width of which corresponds to the inner width of the first tubular section (6) of the carrier (5), whereby these long center parts (17A, 17B, 17A', 17B') are limited opposite each arm by a slot (18, 18') the length of which is equal to the length of the first tubular section (6) of the carrier (5).

18. Device according to claim 13 further comprising a comb (9, 14) with teeth (13) arranged in parallel and spaced at a step P2 the value of which is equal to, or several times, the value of step P1 of the elements of identification (4) in rows (2), whereby these teeth (13) conform to receive and carry, in a removable manner, a carrier (5) for the elements of identification (4).

19. Device according to claim 18, characterized in that the comb (14) consists of several toothed sections (14A, 14B) which can be assembled and separated by appropriate means (18, 19) on one or the other of joint faces (15) of appropriate thickness, on the comb, the teeth (13A, 13B) of the assembled comb belonging, respectively, to the toothed sections (14A, 14B).

20. Device according to claim 19, characterized in that the successive teeth (13A, 13B) of the comb belong, respectively and alternatively to toothed sections, whereby the pick-up (8, 8') has arms (11A', 11B') the number of which is equal to the number of toothed sections (14A, 14B) of which the comb consists.

21. Device according to claim 19, characterized in that the comb (14) consists of two halves (14A, 14B) which can be appropriate means (18, 19) on one or other of joint faces (15) of appropriate thickness, the successive teeth (13A, 13B) of the assembled and separated comb (14) belonging, alternatively, to one or the other half and being separated on each half by a step P2 equal to, or double the step P2 of the arms of the pick-up (8').

22. Device according to claim 21, characterized in that the teeth (13A) of at least one of the halves (14A) of the comb (14) are transported in a manner so that all teeth are arranged on the same face once the two halves are assembled.

23. Device according to claim 19, characterized in that the comb (14) consists of two halves (14A, 14B) which can be assembled and separated by appropriate means (18, 19) on one side or the other of joint faces (15) of appropriate thickness, the successive teeth (13A, 13B) of the assembled comb (14) belonging, alternatively, to one or the other half and being divided on one half into pairs (15A to 15D) of two teeth, separated between the pairs by an interval (16) capable to receive a pair of two teeth belonging to the other half, the successive teeth being separated on the assembled comb by a step P2, whereby the arms (11A to 11D) of the pick-up (18) are four in number and are separated by a step P2 which is identical to the step at which the teeth are spaced on the assembled comb.

24. Device according to claim 23, characterized in that the teeth (13A) of at least one of the halves (14A) of the comb (14) are transported in a manner so that all teeth are arranged on the same face once the two halves are assembled.

* * * * *